(12) United States Patent
Gutekunst et al.

(10) Patent No.: US 10,961,011 B2
(45) Date of Patent: Mar. 30, 2021

(54) CONTAINER HAVING VARYING WALL THICKNESS

(71) Applicant: Berry Global, Inc., Evansville, IN (US)

(72) Inventors: Brady G. Gutekunst, Anaheim, CA (US); Jacob R. Kent, Valley Mills, TX (US); Kiran M. D'Silva, Newburgh, IN (US)

(73) Assignee: Berry Global, Inc., Evansville, IN (US)

( * ) Notice: Subject to any disclaimer, the term of this patent is extended or adjusted under 35 U.S.C. 154(b) by 23 days.

(21) Appl. No.: 15/921,948

(22) Filed: Mar. 15, 2018

(65) Prior Publication Data
US 2018/0265243 A1    Sep. 20, 2018

Related U.S. Application Data

(60) Provisional application No. 62/471,445, filed on Mar. 15, 2017.

(51) Int. Cl.
| | | |
|---|---|---|
| *B65D 1/42* | (2006.01) | |
| *B65D 1/02* | (2006.01) | |
| *B29C 49/06* | (2006.01) | |

(52) U.S. Cl.
CPC .............. *B65D 1/42* (2013.01); *B65D 1/023* (2013.01); *B65D 1/0215* (2013.01);
(Continued)

(58) Field of Classification Search
CPC ...... B65D 1/42; B65D 1/0215; B65D 1/0246; B29B 2911/14328; B29B 2911/14331; B29B 2911/14332; B29B 2911/14335; B29B 2911/14337; B29B 2911/14338; B29B 2911/14046; B29B 2911/14713; B29C 49/06
(Continued)

(56) References Cited

U.S. PATENT DOCUMENTS 5,066,528 A * 11/1991 Krishnakumar .... B29C 49/0073
428/36.92
5,104,706 A    4/1992 Krishnakumar
(Continued)

FOREIGN PATENT DOCUMENTS

DE    19917916 B4    10/2000

OTHER PUBLICATIONS

Polyethylene Terephthalate Key Properties, Data Sheet (online), Phoenix Technologies LLC, Publication Date: 2008 (retrieved May 13, 2018), <URL:http//www.phoenixtechnologies.net/media/371/PET%20Properties%202008.pdf> entire document, 1 page.
(Continued)

*Primary Examiner* — James N Smalley
*Assistant Examiner* — Elizabeth J Volz
(74) *Attorney, Agent, or Firm* — Barnes & Thornburg LLP

(57) ABSTRACT

A container includes a body that at least partially defines a product storage region. The container further includes a neck that extends upwardly from the body and that has an opening that opens into the product storage region to allow filling of the product storage region with contents and discharge of those contents. The container further includes a floor and a heel. Some areas of the container have varying material distribution or wall thickness.

13 Claims, 2 Drawing Sheets

(52) U.S. Cl.
CPC ......... *B65D 1/0246* (2013.01); *B65D 1/0261* (2013.01); *B29B 2911/14046* (2013.01); *B29B 2911/14328* (2015.05); *B29B 2911/14331* (2015.05); *B29B 2911/14332* (2015.05); *B29B 2911/14335* (2015.05); *B29B 2911/14337* (2015.05); *B29B 2911/14338* (2015.05); *B29B 2911/14713* (2013.01); *B29C 49/06* (2013.01)

(58) Field of Classification Search
USPC .......................... 220/606, 669, 675; 215/382
See application file for complete search history.

(56) References Cited

U.S. PATENT DOCUMENTS

| | | | | |
|---|---|---|---|---|
| 5,198,248 | A * | 3/1993 | Krishnakumar | .... B29C 49/0073 215/373 |
| 6,551,672 | B2 * | 4/2003 | Hessok | ..................... A61J 1/00 206/168 |
| 2012/0024813 | A1 * | 2/2012 | Nakagawa | ........... B65D 1/0246 215/40 |
| 2016/0167823 | A1 * | 6/2016 | Gutekunst | ............ B65D 1/0223 206/459.5 |

OTHER PUBLICATIONS

International (PCT) Search Report for PCT/US2018/022610 established Jun. 11, 2018, BP-528 WO ||, 10 pages.

\* cited by examiner

CONTAINER HAVING VARYING WALL THICKNESS

PRIORITY CLAIM

This application claims priority under 35 U.S.C. § 119(e) to U.S. Provisional Application Ser. No. 62/471,445, filed Mar. 15, 2017, which is expressly incorporated by reference herein.

TECHNICAL FIELD

The present disclosure relates to containers and particularly to containers having varying material distribution.

BACKGROUND

Bottles or containers are often used to store or hold contents, including but not limited to liquids. For example, bottles can store a beverage, drink, or other liquid. Such a bottle or container may be configured to receive a closure, such as a bottle cap.

A variety of materials have been employed as the materials of construction for containers and bottles. For example, containers and bottles have been made of glass and/or plastic. Such materials have been used, at least in part, because they securely contain liquids or other contents while also providing sufficient structural rigidity and integrity to survive filling, bottling, distributing, shipping, handling, etc.

SUMMARY

Certain embodiments according to the present disclosure provide a bottle that has a bottle wall, the bottle wall having variable thickness with material redistributed in reinforced areas.

In one aspect, for instance, some embodiments may provide a bottle having a neck and a body. The bottle may extend from a top to a bottom and have a height measured from the bottom to the top. The neck may be disposed between the top of the bottle and the body and the body may be disposed between the neck and the bottom of the bottle. The body may extend from a bottom of the body to a top of the body, the body having at least one body wall thickness. The neck may have a relatively smaller outer diameter than an outer diameter of the body. The bottle outer diameter may transition from the neck outer diameter to the relatively larger body outer diameter through a shoulder having a varying shoulder outer diameter. The shoulder may have a bottom with a shoulder bottom diameter approximately that of the body diameter. The bottle wall thickness may be variable over the height of the bottle. The bottle may include one or more material reinforced areas around a perimeter or circumference of the bottle. The material reinforced area may be located adjacent at least one of the bottom of the shoulder and the bottom of the body. The material reinforced area may have a material reinforced area wall thickness approximately equal to or greater than the greatest body wall thickness.

The bottle or bottle wall may include six reference locations: a first location, a second location, a third location, a fourth location, a fifth location, and a sixth location. The first location may be on the neck and nearer the top of the bottle than any of the other five locations. The second location may be at the junction of the bottom of the neck and the top of the shoulder. The third location may at the junction of the bottom of the shoulder and the top of the body. The fourth location and the fifth location may be on the body, with the fourth location interposed between the third location and the fifth location. The sixth location may be on a heel or bottom of the bottle. Of the subset of the third location, the fourth location, the fifth location, and the sixth location, the bottle may have an average bottle wall thickness that is greatest at the sixth location followed by the third location, or vice versa. The bottle wall thickness may be greater adjacent at least one of the first location and the second location than the bottle wall thickness adjacent at least one of the third location and the sixth location. The bottle may be substantially formed of polyethylene terephthalate (PET). The bottle may have a Young's modulus in the range of about 295,000 psi to about 365,000 psi. The bottle may have a Young's modulus of about 325,000 psi. The shoulder wall thickness at the bottom of the shoulder may be between about 0.015 inches and about 0.025 inches. The body wall thickness at the bottom of the body may be between about 0.015 inches and about 0.028 inches. A heel may be disposed between the body and the floor, the heel having a top with a heel top diameter approximately that of the body diameter. If included, the heel and/or heel top may have a wall thickness greater than the body wall thickness. The thickness of the bottle wall adjacent the heel and/or heel top may be in the range of about 28% to about 58% the thickness of the bottle wall at the neck. The thickness of the bottle wall adjacent the bottom of the shoulder may be in the range of about 31% to about 54% the thickness of the bottle wall at the neck.

In another aspect, for instance, some embodiments may provide a container having an opening adjacent the top of the container and configured to allow filling of a product storage region with contents and discharge of those contents. The product storage region may be at least partially defined by a body and a floor. The body may be interposed between the opening and the floor. The floor may at least partially form a bottom of the container, which floor may have a first floor thickness. A neck may be disposed between the body and the opening and be configured to allow the passage of contents into and out of the product storage region. The neck may have at least one neck wall thickness at a first neck location. A shoulder may be disposed between the body and the neck, the shoulder having at least one shoulder thickness at a first shoulder location. A heel may be disposed between the body and the floor, the heel having at least one heel thickness. The body may have a body wall extending from a bottom of the shoulder to a top of the heel, the body wall having at least one body wall thickness. A material reinforced area may be located substantially around the perimeter of the bottle at a first reinforced material location and may have a material reinforced wall thickness. The material reinforced wall thickness may be greater than the greatest body wall thickness. The material reinforced area may be adjacent at least one of the heel and the bottom of the shoulder.

In yet another aspect, for instance, some embodiments may provide a bottle having a neck and a body. The body may have at least one body wall thickness. The neck may have a relatively smaller diameter than the body. The neck diameter may transition to the relatively larger body diameter through a shoulder having varying diameter. The shoulder may have a bottom with a shoulder bottom diameter approximately that of the body diameter. A heel may be disposed between the body and the floor, the heel may have a top with a heel top diameter approximately that of the body diameter. A material reinforced area may be located around the heel. The material reinforced area may have a material reinforced area wall thickness greater than the greatest body wall thickness.

BRIEF DESCRIPTION OF THE DRAWINGS

The detailed description particularly refers to the accompanying figures, in which.

DETAILED DESCRIPTION

Embodiments now will be described with reference to the accompanying figures, in which some, but not all embodiments are shown. Indeed, embodiments may take many different forms and the present disclosure should not be construed as limited to the embodiments set forth herein. As used in the specification, and in the appended claims, the singular forms "a", "an", "the", include plural referents unless the context clearly dictates otherwise.

The terms "substantial" or "substantially" may encompass the whole as specified, according to certain embodiments, or largely but not the whole specified according to other embodiments.

Figure 1:
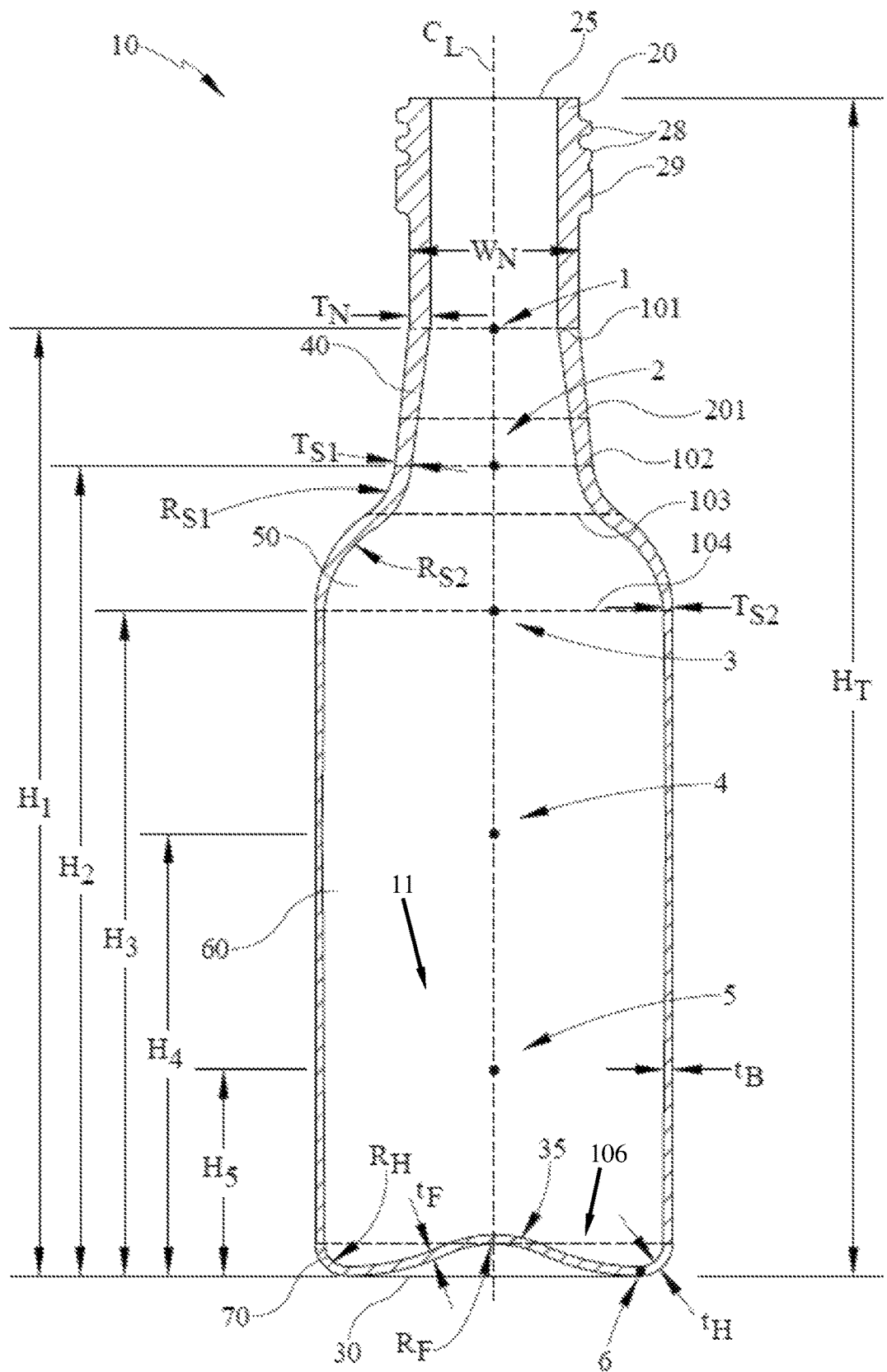
FIG. 1 illustrates a front cross-sectional view of an embodiment of a container or bottle.

Some embodiments of a container or bottle 10, such as the embodiment shown in FIG. 1, may include a top 20, a bottom 30, a floor 35, a neck 40, a shoulder 50, a body 60, and/or a heel 70. This or other embodiments of container or bottle 10 may be configured to hold contents, such as a liquid, within it. Bottle 10 may be configured to have a relatively low weight or light weight compared to other similarly sized bottles. Low weight or light weight bottle 10 may include one or more openings or apertures, such as bottle opening 25, which may be configured to allow filling, pouring, and/or discharge of contents from bottle 10, and/or which may be located at or near top 20.

Bottle 10 and/or opening 25 may be closed, such as by applying a bottle closure (not shown), to retain contents within bottle 10. Bottle 10 may include an interior product storage region 11, which may be configured to store liquid contents and/or pourable contents, and/or any other type of contents or any combination thereof. In some embodiments, interior product storage region 11 may be at least partially defined by top 20, bottom 30, floor 35, neck 40, shoulder 50, body 60, and/or heel 70, for example, as shown in FIG. 1. A bottle closure, if included, may be removed from bottle 10 that may be filled with pourable contents, for example, and the contents may be poured out. One or more threads 28 and/or one or more stops or bands 29 may be included for engagement with a closure or other feature, for example, allowing a closure to screw and/or thread to engage threads 28 of bottle top 20 to allow closure to be adjacent stop or band 29.

Container or bottle 10 may be of any of a variety of shapes, including, but not limited to, the generally cylindrical shape illustrated in FIG. 1. In this embodiment, bottle 10 may be relatively wide at body 60 and/or bottle 10 may be relatively narrow at neck 40 and/or at or near top 20. For example, top 20 and/or neck 40 may have an outer diameter of approximately 0.5 to 0.7 inches, or about 0.61 inches, and/or body 60 may have an outer diameter of approximately 1.2 to 1.3 inches, or about 1.242 inches.

Bottle 10 may be rounded and/or tapered at neck 40, shoulder 50, and/or heel 70. Neck 40, shoulder 50, and heel 70, if included and rounded or tapered, may be so configured to transition between areas or locations of various widths or diameters, to reduce stress concentrations, and/or for any other reason or combination thereof. For example, beginning at location 1 shown in FIG. 1 and moving down neck 40, neck 40 may begin to taper or flare outwardly with increasing diameter at an outward angle of about 5-8 degrees or about 6.5 degrees as shown in FIG. 1. Shoulder 50 may have an upward or first radius of curvature $R_{S1}$ of about 0.2 to about 0.3 inches or about 0.25 inches as shown in FIG. 1. Shoulder 50 may have a lower of second radius of curvature $R_{S2}$ of about 0.4 to about 0.5 inches or about 0.42 inches as shown in FIG. 1. Bottle 10 may have at or near heel 70 a radius of curvature $R_H$ of about 0.1 to about 0.2 inches or about 0.12 inches as shown in FIG. 1. Bottle 10 may have a substantially curved and/or concave floor 35 that may include a floor radius of curvature $R_F$ which may be about 1.1 to about 1.4 inches or about 1.21 inches as shown in FIG. 1.

Body 60 or any other component of bottle 10, such as top 20, neck 40, shoulder 50, or heel 70, may vary in width over its length or height, and could be narrower or wider than shown, or may vary between narrower and wider portions. Bottle 10 or any component thereof may vary in shape and size from that shown in FIG. 1. The shape, size, and configuration of container or bottle 10 illustrated in FIG. 1 is not meant to limit the shapes, sizes, or orientations available for forming container or bottle 10.

One embodiment of container 10 may be configured for storage of approximately 50 mL of fluid or beverage, such as bottle 10 illustrated in FIG. 1. A bottle or container configured to be filled with and/or store about 50 mL of liquid may include a target fill line, such as a fill line 201, but may in fact have additional capacity. For example, bottle 10 shown in FIG. 1 may be configured to be filled with 50 mL plus or minus 10% (or 5 mL), so that it may be filled with and/or store up to at least about 55 mL.

In use, bottle 10 may typically be filled, capped or closed, and placed in boxes and/or on pallets or the like to be prepared for shipping or distributing. Bottle 10 may be formed to withstand certain environmental or external forces and/or factors. For example, bottle 10 may be formed to withstand a certain top load that may occur during capping, such as with a roll on pilfer proof (ROPP) finish or the like, or at any time thereafter. For further example, boxes and/or pallets of bottles 10 may be stacked on top of one another and/or other things may be stacked on them. For these or any other reason, bottle 10 may be made to have a certain ability to support a load or weight. For example, for the aforementioned 50 mL bottle 10, a target top load for bottle 10 may be approximately 130 pounds. Another target top load may take in to account a safety factor, for example, with a safety factor of at least about 15%, the 130 pound rating without a safety factor may become a target top load rating of approximately 150 pounds.

One example of a typical 50 mL bottle, configured as shown in FIG. 1, may be bottle 10 that is configured to withstand such a top load but is lighter in weight than other available bottles of similar volume. For example, provided for comparison purposes to light weight bottle 10, a different 50 mL bottle currently available from Berry Global, Inc., may have a material weight of approximately 11 grams when constructed of polyethylene terephthalate (PET). Such a PET bottle weighing about 11 grams may have an overall height of about 4.151". The height of about 4.151" is a target and the height may be within a target range based, for example, at least partially on manufacturing tolerances. For example, the height of bottle 10 may be about 4.151" plus or minus about 0.05" and/or the height may be between about 4.1" and about 4.2".

The 11 gram bottle discussed above may have a shape generally similar to that of light weight bottle 10, though the 11 gram bottle and low weight bottle 10 may have different thicknesses and/or material allocations or distributions at certain points or locations thereon. For example, the 11 gram bottle and the light weight bottle 10 may each have a generally cylindrical shape, body, heel, neck, and/or shoulder, and/or an overall height of about 4.1" to about 4.2" or about 4.151". In the case of low weight bottle 10, the overall height may be indicated by total height $H_T$.

Some reference points and dimensions of low weight bottle 10 are shown in FIG. 1. Location 1, indicated by reference numeral 1, may be located on neck 40, for example, at a height $H_1$ measured from bottom 30 to a first horizontal line 101 and/or location 1. In some embodiments, neck 40 may transition at or near location 1 from a substantially uniform outer diameter not including threads 28 or band 29 or similar features of, for example, about 0.5" to about 0.7" or 0.61", at or above location 1 to a tapered or frustoconical section below location 1. Examples of dimensions, such as height $H_1$ and diameter at location 1 are listed below. Location 2, indicated by reference numeral 2, may be located at or near the bottom of neck 40 and/or at or near the top of shoulder 50, for example, at a height $H_2$ measured from bottom 30 to a second horizontal line 102. In this embodiment, shown just above second horizontal line 102 is fill line 201. Bottle 10 may transition at or near location 2 from neck 40 to shoulder 50. For example, at location 2, bottle 10 may transition from the aforementioned tapered or frustoconical neck to a curved or rounded section at upper shoulder 50 that may have, for example, a first shoulder radius $R_{S1}$. Such a curved section at upper shoulder 50, if included, may be at least partially concave as shown in FIG. 1 (the center of radius $R_{S1}$ may be outside bottle 10). At or near a third horizontal line 103, shoulder 50 may transition from first radius $R_{S1}$ to a second radius $R_{S2}$, which may be at least partially convex as shown (the center of radius $R_{S2}$ may be inside bottle 10. Location 3, indicated by reference numeral 3, may be located at or near the bottom of shoulder 50 and/or at or near the top of body 60, for example, at a height $H_3$ measured from bottom 30 to a fourth horizontal line 104, which may have a diameter, for example, of about 1.1 to about 1.4 inches or about 1.24 inches. Bottle 10 may transition at or near location 3 from shoulder 50 to body 60, for example from the convex curved bottom portion of shoulder 50 to a substantially cylindrical portion of body 60, as shown in FIG. 1.

Locations 4 and 5 may be located on body 60 at respective heights $H_4$ and $H_5$ as shown in FIG. 1. Location 6 may be on bottom 30, floor 35, bottom of body 60, and/or heel 70, any or all of which may coincide at some points, and/or location 6 may be at or near bottom 30 and have a height of zero relative thereto. Location 6 may be located on heel 70 or if no heel 70 is included, location 6 may be at or near the bottom of body 60, where body 60 meets the bottom portion of bottle 10. In FIG. 1, the bottom of body 60 may be shown by the horizontal dashed line 106. Body 60 may transition to heel 70 as shown, with heel 70 having a heel radius of curvature $R_H$. Location 6 may have a height above bottom 30 of bottle 10, for example, if location 6 is located at the bottom of body 60 and heel 70 has a radius $R_H$ of between about 0" and about 0.25", radius RH may be in the range of about 0.05" to about 0.15", and/or radius $R_H$ may be about 0.125". Heel 70 may transition to floor 35 having a floor radius of curvature $R_F$, as may be the case in embodiments having a substantially concave floor. Locations 1, 2, 3, 4, 5 and 6 may serve as reference points when measuring bottle wall thicknesses, as discussed more below. Body 60 is shown in cross-section to illustrate relative thicknesses of the bottle wall of bottle 10 at various locations or heights. Some thicknesses, such as a floor or floor wall thickness $t_F$, a heel or heel wall thickness $t_H$, a body or body wall thickness $t_B$, a first or top shoulder or shoulder wall thickness $t_{S1}$, a second or bottom shoulder or shoulder wall thickness $t_{S2}$, and a neck or neck wall thickness $t_N$ are shown at shown at various locations on bottle 10. It is understood that any or all thicknesses related to sections of bottle 10 may vary due, for example, to gradual change in thickness between locations. Example thicknesses of bottle 10 at locations 1, 2, 3, 4, 5, and 6 are shown in Table 3 below and discussed in more detail below.

Any or all components of bottle 10 may form a bottle wall, extending from the top 20 of bottle 10 to the bottom 30 of bottle 10, and the bottle wall may have varying thicknesses along its height, as shown in FIG. 1. For example, neck 40 may include a wall having a first or top neck thickness $t_N$, shoulder 50 may include a wall having a first or top shoulder thickness $t_{S1}$ and/or a second or bottom shoulder thickness $t_{s2}$, body 60 may include a wall having one or more body wall thickness $t_B$, and heel 70 may include a heel wall having a heel wall thickness $t_H$. The aforementioned thicknesses, individually or collectively, may have varying thicknesses, which may define a bottle wall thickness that is variable over the height of the bottle. The walls of neck 40, shoulder 50, body 60, heel 70, bottom 30, and/or floor 35 may substantially define a hollow region therein and/or an interior product storage region.

Bottle 10 may have respective heights, measured as a distance from bottom 30 toward top 20, such as at or near locations 1, 2, 3, 4, 5, and/or 6 shown in FIG. 1 and discussed above. For example, for a 50 mL bottle 10 with an approximate height of 4.151", locations 1, 2, 3, 4, 5, and 6 may have the following approximate heights from bottom 30 and/or outer diameters, with all measurements approximate:

Location 1—about 3.25" plus or minus about 0.05" (height $H_1$), diameter about 0.61";
Location 2—about 2.75" plus or minus about 0.05" (height $H_2$), diameter about 0.72";
Location 3—about 2.5" plus or minus about 0.05" (height $H_3$), diameter about 1.24";
Location 4—about 1.5" plus or minus about 0.05" (height $H_4$), diameter about 1.24'";
Location 5—about 0.5" plus or minus about 0.05" (height $H_5$), diameter about 1.24"; and
Location 6—about 0" to about 0.25".

If bottle 10 takes the shape shown in FIG. 1, the locations 1, 2, 3, 4, 5, and 6 may generally correlate to:
Location 1—neck 40, between bottom and top of neck 40;
Location 2—bottom of neck 40 and/or top of shoulder 50;
Location 3—bottom of shoulder 50 and/or top of body 60;
Location 4—mid body 60;
Location 5—lower body 60; and
Location 6—bottom 30, heel 70, and/or bottom of body 60.

The average wall thicknesses at or near locations similar in height to locations 1, 2, 3, 4, 5, and 6 for an 11 gram PET bottle available from Berry Global, Inc. were measured to be approximately those shown in Table 1.

TABLE 1

11 gram PET Bottle Wall Thickness Data

| Location | Thickness in Inches |
| --- | --- |
| 1 | 0.0724 |
| 2 | 0.0615 |
| 3 | 0.0243 |
| 4 | 0.0240 |
| 5 | 0.0276 |
| 6 | 0.0211 |

An 11 gram PET bottle available from Berry Global, Inc. may have a generally similar shape and/or height or relative heights as light weight bottle 10. If so, the 11 gram bottle may have locations approximately similar to locations 1, 2, 3, 4, 5, and 6 of light weight bottle 10, which may be referenced for comparison purposes. It is understood that other dimensions, such as wall thicknesses between the 11 gram bottle and light weight bottle 10 may be different at any or all of the locations referenced herein.

Top load testing was conducted on a number of such 11 gram PET bottles. In these tests, with a bottle positioned between a top plate and a bottom plate and subject to compression by downward movement of the top plate at 1.0" per minute (i.e. top load testing), it was shown that the aforementioned 11 gram PET bottle withheld a top load of about 270 pounds on average. See Table 2, below, for additional top load testing data of the aforementioned 11 gram bottle. The average top load for seven subgroups, each subgroup including 32 samples, was about 273 pounds. The range in Table 2 indicates the difference between the highest top load result and the lowest top load result in a given subgroup, and the standard deviation is that of the given subgroup. It is understood that some variability in top load testing results is expected, for example, due to inherent variability in material batches used and/or variability in some or all dimensions of the bottles tested resulting from the manufacturing processed used to make them.

TABLE 2

Top Load Test Data for 11 gram PET Bottle

| | Subgroup (each having 32 samples) | | | | | | |
| --- | --- | --- | --- | --- | --- | --- | --- |
| | 1 | 2 | 3 | 4 | 5 | 6 | 7 |
| Average Top Load (#) | 256.1 | 256.7 | 280.1 | 280.9 | 282.2 | 281.2 | 275.3 |

The results of top load testing of samples of 11 gram PET bottles were generally consistent with theoretical top load results from finite element analysis (FEA). FEA predicted a top load of about 250 pounds for the 11 gram PET bottle. The 11 gram bottles subject to the top load testing discussed herein, were manufactured by injection stretch blow molding PET resin. The PET resin used was DAK C60A, commercially available from DAK Americas. The PET resin has a Young's modulus of about 325,000 psi and a yield stress of about 8500 psi. Some variations in top load testing results and/or FEA analysis may be accounted for by the variability in each bottle, for example, due to engineering tolerances and/or variations expected with manufacturing methods, such as blow molding used to form the bottles tested.

It was found that a reduction in material usage and improvement in cycle time during the manufacturing process for bottles of the nature of the 11 gram bottles discussed above was possible while still satisfying certain or predetermined top load requirements by modifying the relative material distribution in bottle 10. For example, to maintain a top load rating of 130 pounds, FEA showed that uniform material reduction by 28% throughout the 11 gram bottle, arriving at a uniformly reduced or proportional 7.9 gram bottle, would result in a theoretical top load of about 138 pounds. While 138 pounds as predicted by FEA may be an adequate top load rating for some applications, it was found that a higher top load rating was possible, such as 150 pounds (130 pounds with a 15% safety factor), by modifying and/or redistributing re-allocating material in light weight bottle 10. The removal of material from some areas allowed redistribution of material at one or more other areas, or material reinforced areas, around the circumference of bottle 10.

Upon FEA and top load testing, unexpected results were found through extensive modification of the material distribution throughout bottle 10. Through the material redistribution of PET bottle 10, described more below, FEA and top load testing showed consistent capacity to support more than 150 pounds of top load according to the top load test described above. The weight or mass of bottle 10 may vary in some embodiments utilizing such material redistribution. For example, in some embodiments, 7.9 gram PET bottle 10 may be within the weight range of approximately 7.9 grams plus or minus approximately 0.5 grams, and/or may weigh within the approximate range of about 7.4 grams to about 8.4 grams. Bottle 10 may be within the weight range of approximately 7.9 grams plus or minus approximately 0.4 grams, and/or may weigh within the approximate range of about 7.5 grams to about 8.3 grams. Bottle 10 may be within the weight range of approximately 7.9 grams plus or minus approximately 0.3 grams, and/or may weigh within the approximate range of about 7.6 grams to about 8.2 grams. Bottle 10 may be within the weight range of approximately 7.9 grams plus or minus approximately 0.2 grams, and/or may weigh within the approximate range of about 7.7 grams to about 8.1 grams. Bottle 10 may be within the weight range of approximately 7.9 grams plus or minus approximately 0.1 grams, and/or may weigh within the approximate range of about 7.8 grams to about 8.0 grams.

When modifying the wall thickness of bottle 10 at locations 1, 2, 3, 4, 5, and 6 shown in FIG. 1 to the thicknesses shown in Table 3, below, the top load test results were significantly higher than expected for a 7.9 gram bottle with uniform material thinning compared to the 11 gram bottle. FEA results also indicated a higher top load rating or capacity for modified light weight bottle 10, when compared to a 7.9 gram bottle with wall thicknesses proportional to those of the 11 gram bottle. These results indicate bottle 10 with modified material distribution may withstand a higher top load than the 7.9 gram bottle with uniform thinning compared to the 11 gram bottle. This indicates improved top load rating at a given weight (e.g., 7.9 grams) and/or improved top load rating efficiency based on material redistribution.

The bottle wall thickness or neck wall thickness at $t_N$ may approximately correspond to the bottle wall thickness at location 1, the bottle wall thickness or top of shoulder wall thickness $t_{S1}$ may approximately correspond to the bottle wall thickness at location 2, the bottle wall thickness or bottom of shoulder wall thickness $t_{S2}$ or top of body wall thickness may approximately correspond to the bottle wall thickness at location 3, the bottle wall thickness or body wall thickness $t_B$ may approximately correspond to the bottle wall thickness or body wall thickness at location 5 as shown in FIG. 1 and/or to the bottle wall or body wall thickness at location 4, and/or the bottle wall thickness or bottom of body wall thickness or top of heel thickness $t_H$ may approximately correspond to the bottle wall thickness at location 6 and/or at the top of heel or bottom of body line 106. It is understood that $t_B$ may be taken along the height or length of body 60, at or between location 2 and bottom of body line 106, and/or body wall thickness $t_B$ may vary along the height of body 60. It is further understood that the bottle wall thickness may change proportionally and/or gradually from location to location and/or across components of bottle 10. Such a change in bottle wall thickness may be, for example, approximately linear along the height of bottle 10, in an area of the same or similar outer diameter or otherwise. For example, if bottle wall thickness and/or heel wall thickness is on average about 0.0208" at location 6 and/or height zero from bottom 30, and if body wall thickness at location 5 and/or at a height of about 0.5" (e.g., $h_5$) is on average about 0.0191", then a thickness of the bottle wall at or near line 106 may be about 0.000425" thinner than the bottle wall at heel 70 and/or this location may have a thickness of about 0.0204". Bottle wall thickness at line 106 may be approximately that of the heel wall thickness at location 6, for example, where heel thickness $t_H$ is approximately uniform. Bottle wall thickness at line 106 may be between about 0.0204" and about 0.0208".

As discussed above, a 7.9 gram PET bottle substantially uniformly thinned from an 11 gram bottle was analyzed using FEA. The approximately 28% weight reduction from the 11 gram bottle to the 7.9 gram bottle was first tested by reducing the thickness of bottle 10 by approximately 28% throughout, resulting in the thicknesses listed in Table 3, below, under the "7.9 gram (proportional)" heading. Based on these thicknesses at relative locations, FEA predicted a top load of about 138 pounds.

Modifying or redistributing the material distribution resulting in 7.9 gram bottle 10 corresponds to a thinning of the material in neck 40 at locations 1 and 2 and in body 60 at locations 4 and 5, when compared to the uniform 28% material reduction across the uniformly thinned 7.9 gram bottle. The modified material distribution, or redistribution, in bottle 10 by removing material from some locations allowed for thickening of material at shoulder 50 at or between locations 2 and 3, and at heel 70 or bottom 30 at location 6, without substantially affecting the overall weight of the bottle. In some embodiments, the thickening of material around the circumference of bottle 10 at or near shoulder 50 and/or at or near heel 70 corresponds to the material reinforced areas.

The relative wall thickness data is shown in Table 3, below, with ratio values below 100% indicating thinner areas than the proportional 7.9 gram design and values above 100% indicating thicker areas than the proportional 7.9 gram design. The ratios of wall thickness at each location 1, 2, 3, 4, 5, and 6 of the modified 7.9 gram design to that of the proportional 7.9 gram design depict the relatively high reduction of material at locations 1, 2, 4, and 5 as compared to locations 3 and 6 when comparing the varying allocations of material between the uniformly reduced 7.9 gram bottle and the modified 7.9 gram bottle 10.

TABLE 3

Wall Thicknesses of Various 50 mL Bottles
Average Wall Thicknesses

| Location | 11 gram | 7.9 gram (proportional) | 7.9 gram bottle (material redistribution) | Ratio of thickness of redistributed 7.9 gram to 7.9 gram proportional bottle |
|---|---|---|---|---|
| 1 | 0.0724" | 0.0521" | 0.0472" | 91% |
| 2 | 0.0615" | 0.0443" | 0.0357" | 81% |
| 3 | 0.0243" | 0.0175" | 0.0198" | 113% |
| 4 | 0.0240" | 0.0173" | 0.0149" | 86% |
| 5 | 0.0276" | 0.0198" | 0.0191" | 96% |
| 6 | 0.0211" | 0.0152" | 0.0208" | 137% |

Table 3 shows the relative redistribution of material in the 7.9 gram modified bottle 10, with locations 1, 2, 4, and 5 having less than 100% of the thickness of the 7.9 gram uniformly reduced, or proportional, bottle at similar respective locations (e.g., heights from the bottom). This ratio or percentage was measured at about 91% on average at location 1, about 81% on average at location 2, about 86% on average at location 4, and about 96% on average at location 5. Locations 3 and 6 of the redistributed 7.9 gram bottle 10 design were measured to have thicknesses of 113% and 137%, respectively, of the thickness of the uniformly reduced 7.9 gram bottle. Thicknesses between locations 1 and 2, between 2 and 3, between 3 and 4, between 4 and 5, and/or between 5 and 6 may change gradually, or on a gradient, from one location to the next. For example, if bottle 10 is 81% as thick at location 2 as a uniformly thinned 7.9 gram bottle at a similar location and 113% as thick at location 3 as the uniformly thinned 7.9 gram bottle at a similar location, bottle 10 will likely transition to about 100% as thick at some point between locations 2 and 3.

The thicknesses and ratios in Table 3 and/or elsewhere herein are approximate and may be varied, and the examples provided are non-limiting. Indeed, any or all measurements, including wall thickness, may be averages taken over several samples and/or at several locations on a given sample. For example, wall thickness data was collected at four points around the circumference or perimeter of the bottle at a given location (i.e. four measurements for each of location 1, 2, 3, 4, 5, or 6 or the like), then averaged to establish the thicknesses at each location used herein. For instance, four measurements were taken on a given bottle 10 at location 1, with each measurement at location 1 being separated from the other measurement sites by about 90 degrees around the perimeter of bottle 10. Those four measurements around the circumference of perimeter at a given location were averaged to arrive at an average location thickness for a given bottle. Several bottles were measured in similar ways, and the average location thickness for each bottle was then averaged amongst the several different bottles. As such, the 0.0472" thickness of bottle 10 at location 1 provided in Table 3 is an average of several measurements. Measurements and averages at the other locations 2, 3, 4, 5, and 6 were produced in similar fashion. Ranges of thicknesses measured at each location 1, 2, 3, 4, 5, and 6 of bottle 10 are provided in Table 7 below.

Figure 2:
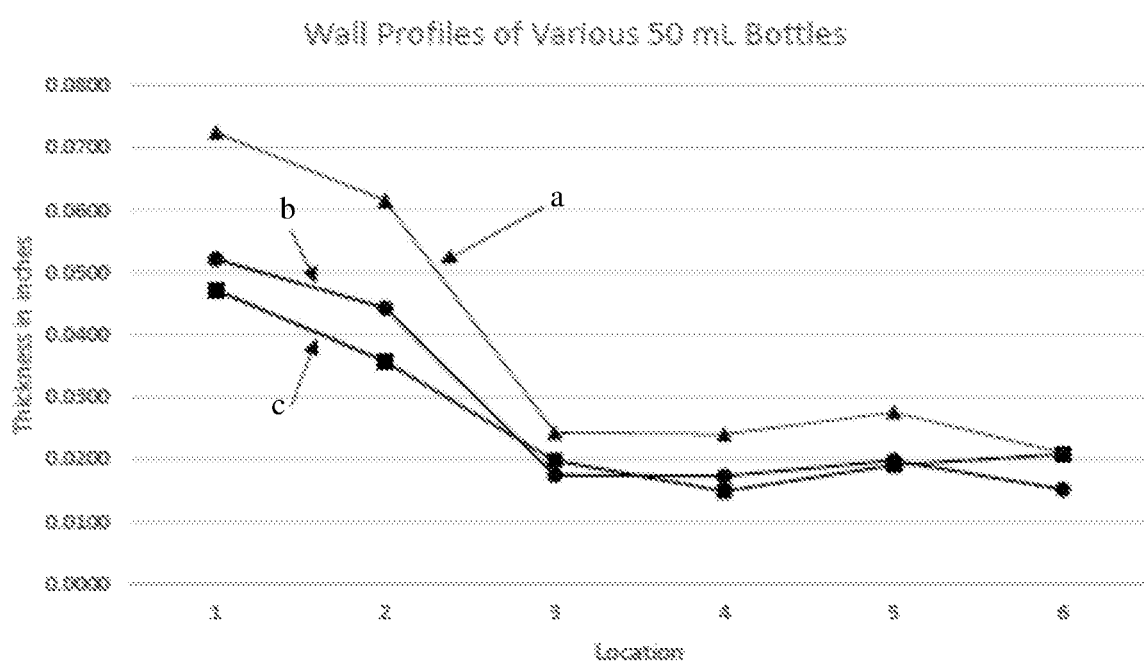
FIG. 2 is a chart illustrating varying wall profiles of similarly shaped bottles, with an overall shape generally similar to that depicted in FIG. 1, but with each bottle having varying thicknesses at particular locations.

The wall profiles of the 11 gram bottle, the 7.9 gram bottle uniformly reduced in thickness based on the 11 gram bottle, and the 7.9 gram bottle with modified material distribution are illustrated in FIG. 2. In FIG. 2, the wall thickness is shown on the y-axis and the aforementioned locations 1, 2, 3, 4, 5, and 6 are shown on the x-axis, together showing the wall profile of the respective bottles. The original 11 gram bottle wall profile is shown, represented by reference character "a" in FIG. 2, as are the uniformly reduced 7.9 gram bottle (represented by reference character "b" in FIG. 2) and the modified 7.9 gram bottle 10 that has the aforementioned modified material distribution and/or thicknesses at various locations 1, 2, 3, 4, 5, and 6 (represented by reference character "c" in FIG. 2). FIG. 2 illustrates the additional thinning of material of the modified 7.9 gram design relative to the uniformly reduced 7.9 gram bottle (uniform 28% reduction compared to the reference 11 gram PET bottle) at locations 1, 2, 4, and 5, as well as the relative thickening of material at locations 3 and 6. It was found that the thickening of material at locations 3 and 6 adds structural rigidity at shoulder 50 and heel 70 or bottom 30. The modified distribution or redistribution of material in the 7.9 gram bottle 10 resulted in higher top load capacity than the 7.9 gram uniformly reduced bottle, as discussed above. This unexpected outcome, resulting from re-distributing material rather than simply uniformly removing material across the bottle, indicates a design that more efficiently handles top load by handling a higher top load with approximately the same overall amount of material (e.g., 7.9 grams).

Table 4, below, compares top load test results to FEA analyses for the various bottles. The 11 gram bottle, included for reference, is a heavier design. The 7.9 gram proportionally reduced bottle, corresponding to the uniform 28% reduction of material from the 11 gram design, was not tested using the top load testing methods described above, as FEA showed it would hold 138 pounds, and it was found that a higher top load rating was possible. The 7.9 gram material redistribution bottle 10 refers to the modified design with re-distributed material as compared to the 7.9 gram proportional design, as discussed above and shown in FIG. 2 as having a wall profile different from the 7.9 gram proportionally or uniformly reduced bottle and the 11 gram bottle. FEA predicted the 7.9 gram modified bottle 10 would support about 164 pounds of top load.

TABLE 4

Top Load Rating of Various Designs

| | Actual Top Load (pounds) | FEA Top Load (pounds) |
|---|---|---|
| 11 gram design | 271 | 250 |
| 7.9 gram proportional thickness reduction | N/A | 138 |
| 7.9 gram modified design with material redistribution | 174 | 164 |

TABLE 5

Top Load Data for 7.9 gram Modified Distribution Design

| | Subgroup (each having 32 samples) | | |
|---|---|---|---|
| | 1 | 2 | 3 |
| Average Top Load (pounds) | 179.5 | 178.4 | 178.1 |

Table 5, above, summarizes top load test data of the 7.9 gram modified distribution, or material redistribution design of PET bottle 10 that was tested many times. The average top load for subgroups 1-3 shown in Table 5 was about 179 pounds. Each subgroup included 32 samples. Top load testing of modified light weight bottle 10 showed a similar but somewhat higher top load testing result, about 178 to about 180 pounds, than the approximately 164 pounds predicted by FEA.

The variability of wall thickness may be achieved in any of a variety of ways, or combination thereof. For example, bottle 10 may be substantially formed of PET and provided in a preform for use in blow molding equipment such as an injection stretch blow molder. If so, the preform of bottle 10 may have varying thickness across its length from top to bottom. The injection stretch blow molder, if used, may be configured to stretch and/or thin material in certain locations more than other locations during the molding process, which may occur instead of or in addition to providing a preform with varying thickness. Injection stretch blow molding, if used, or another process if used instead of or in addition to injection stretch blow molding, may cause gradual change in thickness or provide a gradient wall thickness over any or all of bottle 10. Bottle 10 may be formed with varying gradients or substantially without gradients on bottle 10 or any portion thereof. In some embodiments, bottle 10 may be formed substantially of PET, which may be substantially about 100% PET. In some embodiments, the PET used may be commercially available, such as, for example, DAK C60A, available from DAK Americas.

The relative redistribution of material in the 7.9 gram bottle 10 can also be illustrated by showing ratios of material thickness at locations 1, 2, 3, 4, 5, and 6 as compared to the thickness of material, on average, at a reference location such as location 1 as shown in Table 6, below. Table 6 shows the 11 gram bottle was, of the six locations, on average, thickest at location 1, followed by location 2, then location 5, then location 3, then location 4, then location 6, which had the thinnest material of the six locations. Those ratios were modified in the 7.9 gram bottle 10 so that location 1 was the thickest of the six locations, followed by location 2, then location 6, then location 3, then location 5, and then location 4, which had the thinnest material of the six locations.

TABLE 6

Wall Thickness Ratios
Approximate Wall Thickness Ratios

| Location | 11 gram bottle thickness | Ratio to thickest measured location on the 11 gram bottle | 7.9 gram material redistributed bottle average thickness | Ratio to thickest measured location on the 7.9 gram material redistributed bottle |
|---|---|---|---|---|
| 1 | 0.0724" | 100% | 0.0472" | 100% |
| 2 | 0.0615" | 85% | 0.0357" | 76% |
| 3 | 0.0243" | 34% | 0.0198" | 42% |
| 4 | 0.0240" | 33% | 0.0149" | 32% |
| 5 | 0.0276" | 38% | 0.0191" | 40% |
| 6 | 0.0211" | 29% | 0.0208" | 44% |

The data in Table 6 also shows that modified 7.9 gram bottle 10, with the six locations shown in FIG. 1, is on average thicker at upper neck 40 or location 1 than at the bottom neck 40 and/or the top of shoulder 50 at location 2. Table 6 shows that the thickness at heel 70, bottom 30, and/or location 6 is somewhat thicker but relatively similar in thickness on average to that of the bottom of shoulder 50 at location 3 (e.g., within 2%). It further shows that the heel 70 and/or shoulder 50 at location 3 are thicker than the mid or upper body 60 at location 4 and are thicker than the lower body 60 shown at location 5, on average. Further still, Table 6 shows that the neck locations 1 and 2 are thicker than the body locations 4 and 5 on average, and that the neck locations 1 and 2 are thicker than the shoulder and the heel at location 2, 3, and 6, respectively, on average. The thickness data included in Table 6 refers to average wall thickness at approximately each of the aforementioned six locations. The ratios or percentages provided are based on average thicknesses. The average thicknesses are the same as provided in Table 3, above, and were calculated as described above in reference to Table 3. The averages provided are not limiting, as other thicknesses may be used and/or provided. In some embodiments, the minimum wall thickness may be approximately 0.010".

Table 7 shows ranges of thicknesses measured at locations 1, 2, 4, 5, and 6 across several 7.9 gram PET bottles 10. Moreover, Table 7 shows ratios or percentages of the thickness at each location relative to location 1, with the measurements that form the basis of the ratio ranges taken from vertically aligned locations. For instance, for a given bottle 10, the thickness measurement at location 1 was taken at four points, each about 90 degrees apart (e.g. location 1 at 0 degrees, location 1 at 90 degrees or a quarter turn of bottle 10, location 1 at 180 degrees or a half turn of bottle 10, and location 1 at 270 degrees or a three-quarter turn of bottle 10). The minimum and maximum ratio or percentages provided in Table 7 for each location 1, 2, 3, 4, 5 and 6 were calculated based on the thickness taken at location 1 in vertical alignment with the respective location 2, 3, 4, 5, or 6 measurement. For example, a ratio or percentage minimum taken at location 3 at 180 degrees or a half turn is based on a measurement on the same bottle 10 at location 1 at 180 degrees or a half turn. In another example, a maximum percentage taken at location 6 at 90 degrees or one quarter turn is based on a measurement taken on the same bottle 10 at location 1 at 90 degrees or one quarter turn.

TABLE 7

Thickness and Ratio Ranges
7.9 gram PET Bottle Approximate Thickness and Ratio Ranges

| | Measured Thickness | | Thickness Ratio Based on Location 1 (approximately vertically aligned) | | |
|---|---|---|---|---|---|
| | Minimum | Maximum | Minimum | Maximum | |
| Location 1 | 0.040 | 0.059 | 100% | 100% | Location 1 |
| Location 2 | 0.034 | 0.038 | 62% | 86% | Location 2 |
| Location 3 | 0.015 | 0.025 | 31% | 54% | Location 3 |
| Location 4 | 0.013 | 0.019 | 24% | 43% | Location 4 |
| Location 5 | 0.014 | 0.024 | 28% | 57% | Location 5 |
| Location 6 | 0.015 | 0.028 | 28% | 58% | Location 6 |

Through finite elements analysis, based on the a resin having a Young's modulus of about 325,000 psi, it was found that the material distribution could be varied somewhat and still support theoretical top loads of 130 pounds or more. For example, it was found that the bottom of neck 40 and/or the top of shoulder 50 could be thinned to about 0.0325 inches at or near location 2 and bottom of shoulder 50 and/or top of body 60 could thinned to about 0.018 inches at or near location 3, with the removed material redistributed at or below location 4, and support a top load of about 130 pounds. Based on this material distribution as well as the material distribution of bottle 10 discussed above, FEA predicted the typical fail point from the top load test described above would be in shoulder 50, at or between locations 2 and 3. In another example, FEA predicted the bottle could be thickened to about 0.040 inches at location 2 and to about 0.030 inches at location 3 before failure from the aforementioned top load testing would occur elsewhere. In this example, body 60 was thinned to about 0.015 inches at locations 4 and 5 so the material could be re-allocated generally to shoulder 50, but then FEA predicted the bottle would fail at or near the bottom of body 60 and/or the top of heel 70, and/or at or between locations 5 and 6, at about 146 pounds of top load. In some embodiments, the minimum wall thickness may be approximately 0.010".

Moreover, bottle 10 may be made of any of a variety of materials having any of a variety of material properties. As discussed above, bottle 10 made be substantially formed of PET having a Young's modulus of about 325,000 and a yield stress of about 8500 psi. Other resins and/or other materials having a different Young's modulus and/or a different yield stress may be used instead of or in addition to the aforementioned PET material. FEA showed that, based on the approximate average thicknesses provided for the 7.9 gram modified bottle 10 in Table 6, a PET resin having a relatively low Young's modulus of about 295,000 psi and a relatively low yield stress of about 8,000 psi, would result in bottle 10 having a top load rating of about 151 pounds. For a similarly dimensioned bottle 10, using a PET with a relatively high Young's modulus of about 365,000 psi and a relatively high yield stress of about 9,000 psi, as may be the case with highly oriented PET, FEA predicted bottle 10 would have a top load rating of about 178 pounds. A similarly dimensioned bottle 10 manufactured from a material having a relatively high Young's modulus compared to PET, such as polyvinyl chloride (PVC) having a Young's modulus of about 410,000 psi and a yield stress of about 8000 psi, was predicted by FEA to provide bottle 10 having a top load rating of about 175 pounds. For yet another example, a similarly dimensioned bottle 10 manufactured from a material having a relatively low Young's modulus compared to PET, such as polypropylene (PP) having a Young's modulus of about 230,000 and a yield stress of about 5,500 psi, was predicted by FEA to provide bottle 10 having a top load rating of about 111 pounds.

In some embodiments of bottle 10, the height of neck 40 and/or the height of bottle 10 above shoulder 50 when bottle 10 is in an upright position may be between about 20% and 50% of the overall height of bottle 10, and/or between about 30% and 40% of the overall height of bottle 10, and/or about 34% of the overall height of bottle 10. In some embodiments, for a 7.9 gram bottle 10, the weight of neck 40 and/or the weight of bottle 10 located above shoulder 50 when bottle 10 is in an upright position may be between about 3 grams and about 3.5 grams with the balance in the remainder of bottle 10 (shoulder 50, body 60, heel 70, and/or bottom 30). The weight of neck 40 and/or the weight of bottle 10 located above shoulder 50 when bottle 10 is in an upright position may be between about 3.1 grams and about 3.3 grams with the balance of the weight in the remainder of bottle 10. The weight of neck 40 and/or the weight of bottle 10 located above shoulder 50 when bottle 10 is in an upright position may be about 3.2 grams with the balance of the weight in the remainder of bottle 10. In some embodiments and/or measured embodiments of bottle 10, the weight in neck 40 and/or the weight of bottle 10 located above shoulder 50 was about 3.20 grams and the weight of bottle 10 located in and below shoulder 50 was about 4.74 grams.

Bottle 10, or any component thereof, may take the form of a cylinder with varying outer diameter, such as being narrower at the neck 40 than the body 60, or having a relatively smaller neck 40 outer diameter and a relatively larger body 60 outer diameter, as shown in FIG. 1. In embodiments wherein bottle 10 and/or neck 40 is substantially cylindrical, neck 40 may have an outer diameter shown by $W_N$. However, Bottle 10 may take any of a variety of shapes and/or diameters and/or dimensions, virtually without limitation. For example, bottle 10 or any portion thereof, such as body 60 for example, may take the form of an extending square or rectangle, triangle, polygon, oval, sphere, half-sphere, free form, or any other shape or any combination thereof. In embodiments having a non-cylindrical shape of bottle 10 and/or neck 40, neck 40 may have a width $W_N$. Similarly, other components could have a width and/or an outer diameter dimension that could be shown by FIG. 1. Moreover, different portion of bottle 10 may be of different shapes than any or all other portions of bottle 10. For example, neck 40 may be substantially cylindrical while body 60 is substantially rectangular or substantially spherical. Any of a variety of shapes and combinations thereof may be used to form bottle 10 or any component thereof.

A portion of neck 40 and/or top 20 may be configured to receive, fasten, attach, and/or couple to a closure, such as the bottle closure discussed above (not shown). One mechanism to couple a bottle closure to bottle 10 that may be used is corresponding threads at or near top 20 and also on the bottle closure so that they may be screwed together or apart. Bottle closure and/or another type of closure may be provided with one or more tamper evident features, child resistant features, sealing features, and/or other types of features or any combinations thereof. A portion near top 20 and/or neck 40 may include such features or corresponding features, or other types of features, instead of or in addition to bottle closure or other closure.

Bottle 10 and/or any component thereof may be made of any of a variety of materials, including, but not limited to, any of a variety of suitable plastics material, any other material, or any combination thereof. Suitable plastics material may include, but is not limited to, polyethylene terephthalate (PET), polyethylene (PE), polypropylene (PP), polystyrene (PS), high-density polyethylene (HDPE), low-density polyethylene (LDPE), linear low-density polyethylene (LLDPE), crystallized polyethylene terephthalate (CPET), mixtures and combinations thereof, or any other plastics material or any mixtures and combinations thereof. Multiple layers of material may be used for any of a variety of reasons, including to improve barrier properties, or to provide known functions related to multiple layer structures. The multiple layers, if included, may be of various materials, including but not limited to those recited herein.

Bottle 10 or any component thereof may be substantially rigid, substantially flexible, a hybrid of rigid and flexible, or any combination of rigid, flexible, and/or hybrid, such as having some areas be flexible and some rigid. These examples are merely illustrative, are not limiting, and are provided to illustrate the versatility of options available in various embodiments of bottle 10.

Any of a variety of processes or combination thereof may be used to form bottle 10, any component thereof, or any layer or substrate used therein. For example, any component, layer, or substrate, or combination thereof, may be thermoformed, injection molded, injection stretch blow molded, blow molded, extrusion blow molded, coextruded, subjected to any other suitable process, or subjected to any combination thereof. In some embodiments, bottle 10 and/or any component thereof may be formed substantially of injection stretch blow molded PET, although other materials and forming processes may be used instead of or in addition to PET and injection stretch blow molding, respectively. Various materials and/or processes may be used to form bottle 10 and/or any component thereof as will be understood by one of ordinary skill in the art. In some embodiments, bottle 10 may be substantially a one-piece design and/or substantially formed as an integral or unitary structure.

These and other modifications and variations may be practiced by those of ordinary skill in the art without departing from the spirit and scope, which is more particularly set forth in the appended claims. In addition, aspects of the various embodiments may be interchanged in whole or in part. Furthermore, those of ordinary skill in the art will appreciate that the foregoing description is by way of example only, and it is not intended to limit the scope of that which is described in the claims. Therefore, the spirit and scope of the appended claims should not be limited to the description of the versions contained herein.

That which is claimed:

1. A blow-molded bottle, comprising:
   a neck, a floor, and a body between the neck and the floor;
   the bottle extending from a top to a bottom and having a height measured from the bottom to the top, the bottle having a varying outer diameter over the bottle height, the neck disposed between the top of the bottle and the body, the body disposed between the neck and the bottom of the bottle;
   the body extending from a bottom of the body to a top of the body, the body having at least one body wall thickness;
   the neck having a relatively smaller outer diameter than an outer diameter of the body;
   the bottle outer diameter transitioning from the relatively smaller neck outer diameter to the relatively larger body outer diameter through a shoulder having a varying shoulder outer diameter;
   the shoulder having a bottom with a shoulder bottom diameter approximately that of the body diameter; and
   a bottle wall thickness that is variable over the height of the bottle;
   a material reinforced area around a circumference of the bottle, the material reinforced area located in the neck and the shoulder;
   the material reinforced area having a material reinforced area wall thickness greater than the greatest body wall thickness at a thinnest point of the material reinforced area wall thickness,
   the floor coupled to a lower end of the body and having a floor thickness that is less than the thinnest point of the material reinforced area wall thickness and greater than the greatest body wall thickness.

2. The blow-molded bottle of claim 1, further comprising six locations:
   a first location, a second location, a third location, a fourth location, a fifth location, and a sixth location;
   wherein the first location is on the neck and nearer the top of the bottle than any of the other five locations,
   the second location is at the junction of the top of the bottom of the neck and the top of the shoulder,
   the third location is at the junction of the bottom of the shoulder and the top of the body;
   the fourth location and the fifth location are on the body, with the fourth location interposed between the third location and the fifth location, and
   the sixth location is adjacent the bottom of the body;

wherein out of the subset of the third location, the fourth location, the fifth location, and the sixth location, the bottle has an average bottle wall thickness that is greatest at the sixth location followed by the third location.

3. The blow-molded bottle of claim 2, wherein the bottle wall thickness is greater adjacent at least one of the first location and the second location than the bottle wall thickness adjacent at least one of the third location and the sixth location.

4. The blow-molded bottle of claim 1, wherein the bottle is substantially formed of polyethylene terephthalate (PET).

5. The blow-molded bottle of claim 1, wherein the bottle has a Young's modulus in the range of about 295,000 psi to about 365,000 psi.

6. The blow-molded bottle of claim 5, wherein the bottle has a Young's modulus of about 325,000 psi.

7. The blow-molded bottle of claim 1, wherein the shoulder wall thickness at the bottom of the shoulder is between about 0.015 inches and about 0.025 inches.

8. The blow-molded bottle of claim 1, wherein the body wall thickness at the bottom of the body is between about 0.015 inches and about 0.028 inches.

9. The blow-molded bottle of claim 1, a heel disposed between the body and the floor, the heel having a top with a heel top diameter approximately that of the body diameter; and the heel top having a wall thickness greater than the body wall thickness.

10. The blow-molded bottle of claim 9, wherein the thickness of the bottle wall adjacent the heel top is in the range of about 28% to about 58% the thickness of the bottle wall at the neck.

11. The blow-molded bottle of claim 1, wherein the thickness of the bottle wall adjacent the bottom of the shoulder is in the range of about 31% to about 54% the thickness of the bottle wall at the neck.

12. A blow-molded container, comprising:
a body defining a product storage region and having at least one body wall thickness,
a neck arranged to extend upwardly from the body, the neck having at least one neck wall thickness, the neck being formed to include an opening at a top of the container,
a shoulder disposed between the body and the neck, the shoulder having a shoulder wall thickness, and
a floor coupled to a lower end of the body, the floor having a floor thickness,
wherein the neck wall thickness and the shoulder wall thickness are greater than the greatest body wall thickness and the floor thickness from the opening to a bottom of the shoulder.

13. A blow-molded bottle, comprising:
a neck having threads and a band located below the threads, a floor, and a body; the neck having a relatively smaller neck diameter than a relatively larger body diameter; the neck diameter transitioning to the relatively larger body diameter through a shoulder having a varying diameter; the shoulder having a bottom with a shoulder bottom diameter approximately that of the entire body diameter;
the body having at least one body wall thickness;
a heel disposed between the body and the floor, the heel having a top with a heel top diameter approximately that of the entire body diameter; and
a first material reinforced area around the heel and the floor, the first material reinforced area having a first material reinforced area wall thickness greater than the greatest body wall thickness, and
a second material reinforced area around the neck below the threads and the band, the second material reinforced area having a second material reinforced area wall thickness greater than the greatest body wall thickness and greater than the entire first material reinforced area wall thickness.

* * * * *